US012035087B2

(12) United States Patent
Moro

(10) Patent No.: US 12,035,087 B2
(45) Date of Patent: Jul. 9, 2024

(54) SPACE SAVING ACOUSTIC TRANSDUCER

(71) Applicant: Samsung Electronics Co., Ltd., Suwon-si (KR)

(72) Inventor: Jerry Moro, Moorpark, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/508,863

(22) Filed: Oct. 22, 2021

(65) Prior Publication Data

US 2023/0128869 A1 Apr. 27, 2023

(51) Int. Cl.
*H04R 1/02* (2006.01)
*H04R 7/02* (2006.01)

(52) U.S. Cl.
CPC ................ *H04R 1/02* (2013.01); *H04R 7/02* (2013.01); *H04R 2499/15* (2013.01)

(58) Field of Classification Search
None
See application file for complete search history.

(56) References Cited

U.S. PATENT DOCUMENTS 6,243,472 B1 * 6/2001 Bilan ...................... H04R 1/06 381/407
10,469,954 B1 11/2019 Cheng et al.
2005/0036648 A1 * 2/2005 Nguyen .................. H04R 9/06 381/423
2012/0106776 A1 5/2012 Liu
2012/0328147 A1 12/2012 Kim et al.
2015/0003663 A1 * 1/2015 Biessy .................... H04R 1/06 381/400
2015/0264485 A1 * 9/2015 Athanas .................. H04R 1/00 381/152

FOREIGN PATENT DOCUMENTS

CN 112911474 A 6/2021
KR 10-2017-0134302 A 12/2017

* cited by examiner

*Primary Examiner* — Walter F Briney, III
(74) *Attorney, Agent, or Firm* — Sherman IP LLP; Kenneth L. Sherman; Steven Laut

(57) ABSTRACT

One embodiment provides an acoustic transducer including a diaphragm connected to an upper portion. A first voice coil is connected to a first side of the diaphragm. A second voice coil is connected to a second side of the diaphragm. A first magnetic motor assembly is connected to a first side of a lower portion. A second magnetic motor assembly is connected to a second side of the lower portion. An electronics system is connected to the lower portion and disposed behind the diaphragm and between the first magnetic motor assembly and the second motor assembly. The first voice coil is at least partially disposed within a gap of the first magnetic motor assembly, and the second voice coil is at least partially disposed within a gap of the second magnetic motor assembly.

19 Claims, 8 Drawing Sheets

300

305

310

320

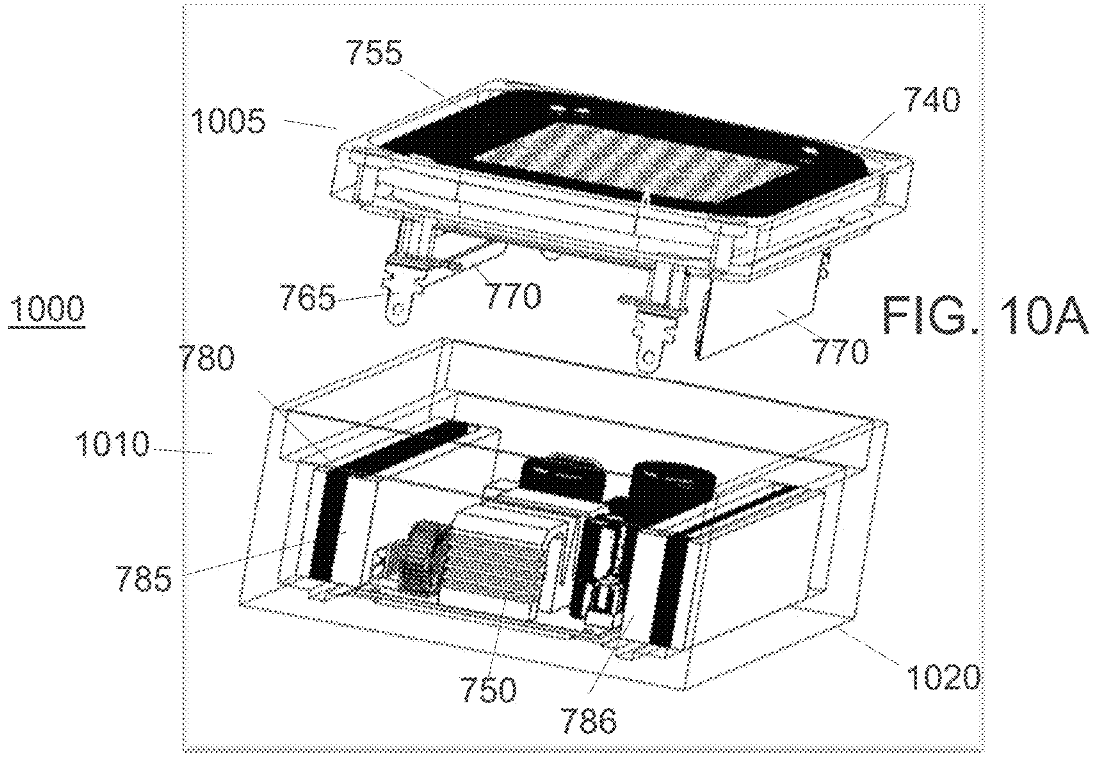
FIG. 10A
FIG. 10B
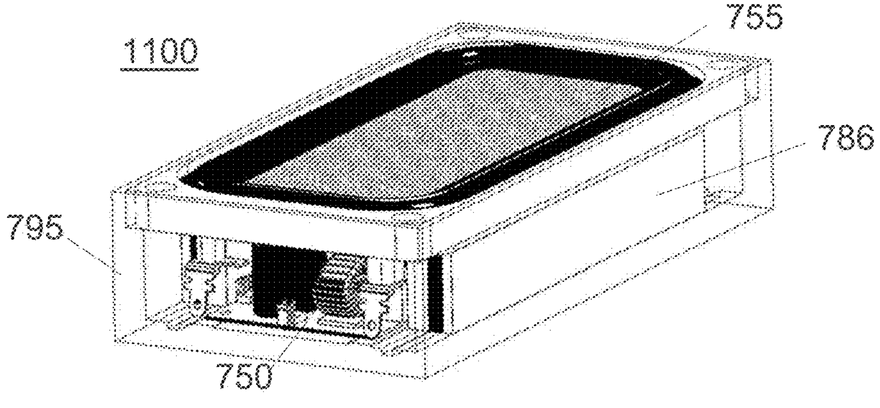
FIG. 11A
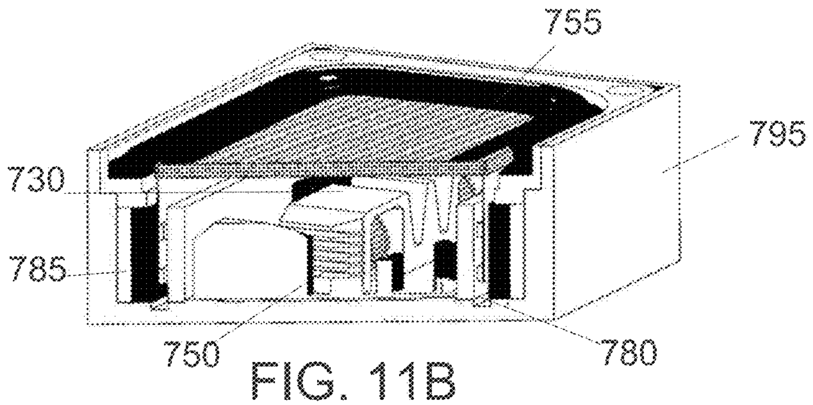
FIG. 11B

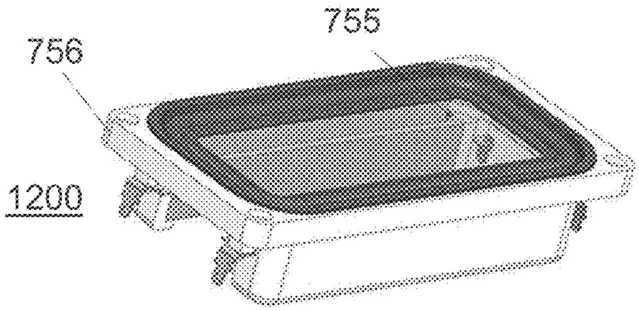
FIG. 12A
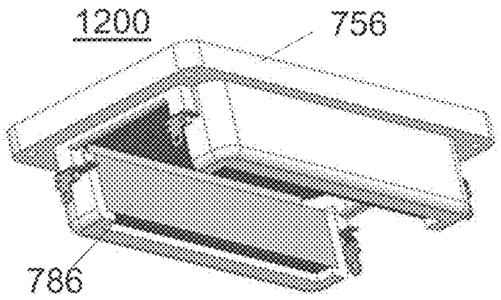
FIG. 12B
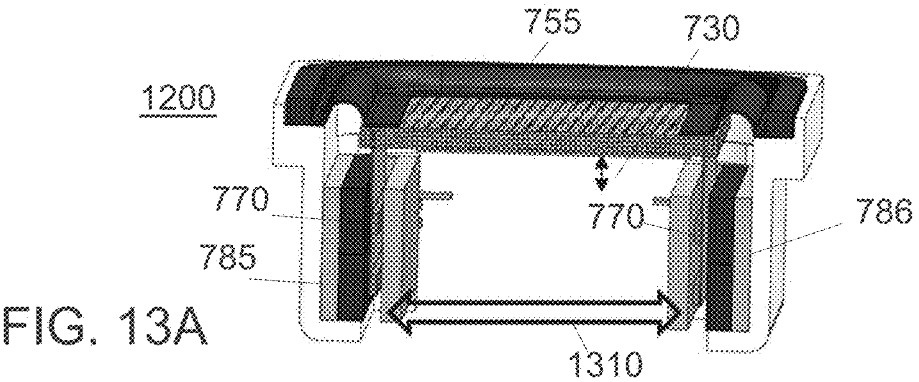
FIG. 13A
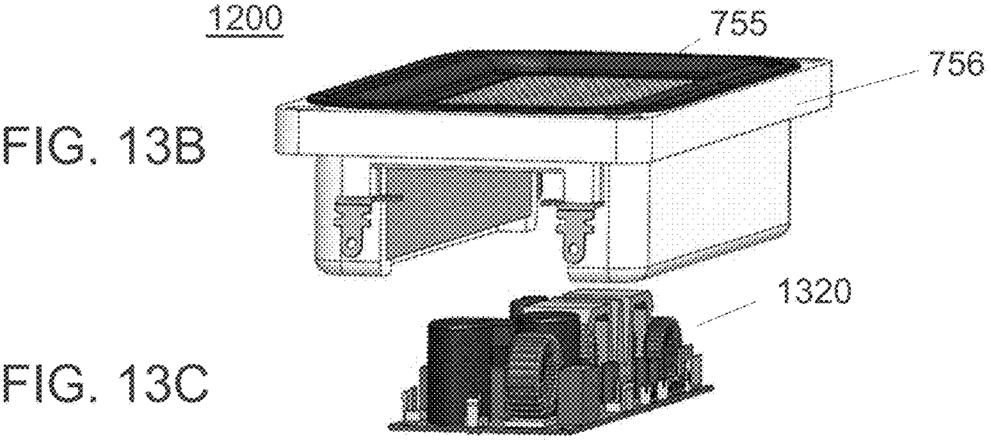
FIG. 13B
FIG. 13C
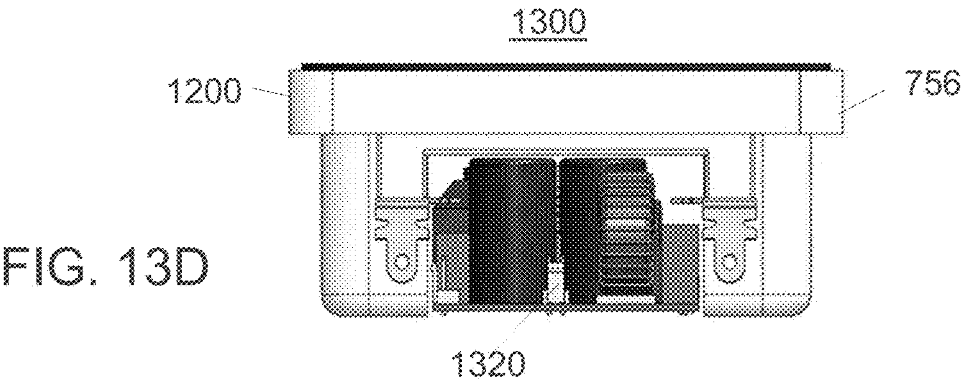
FIG. 13D

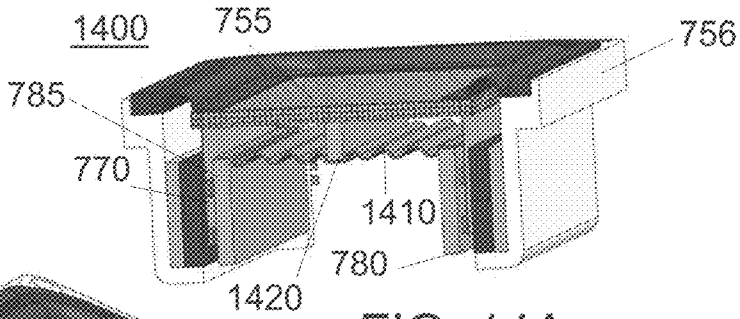
FIG. 14A
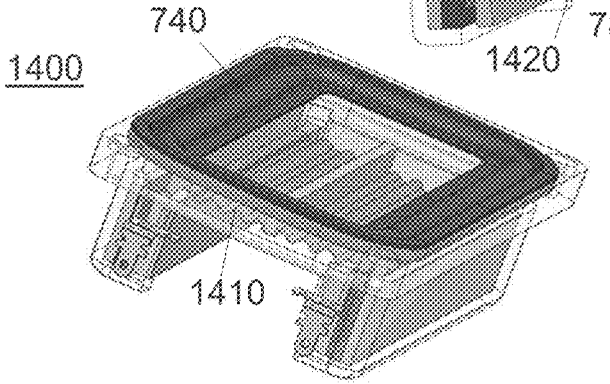
FIG. 14B
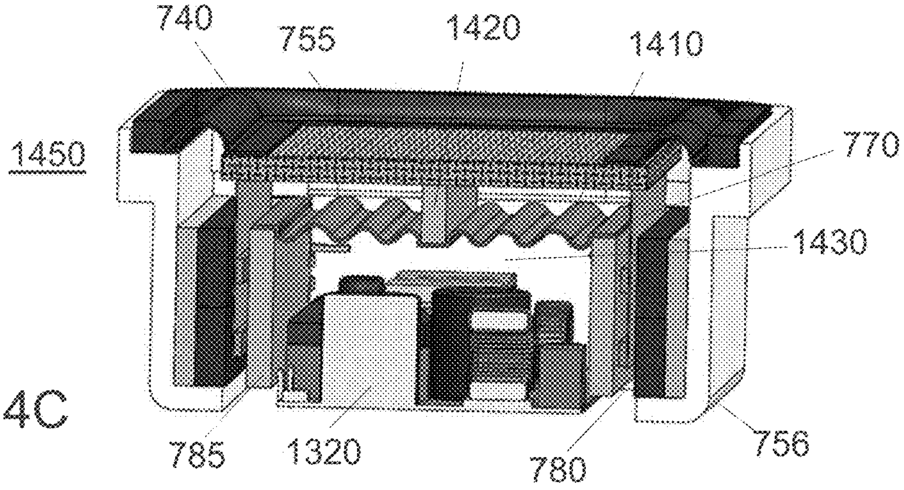
FIG. 14C
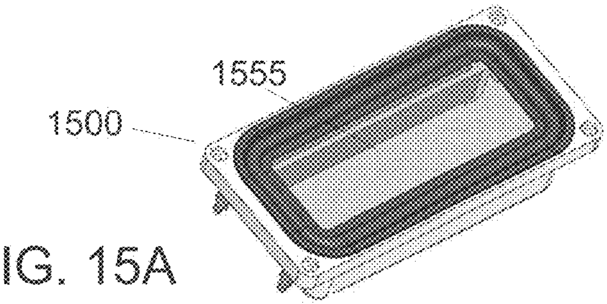
FIG. 15A
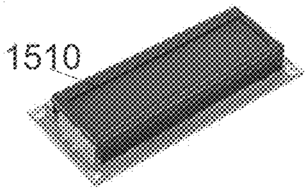
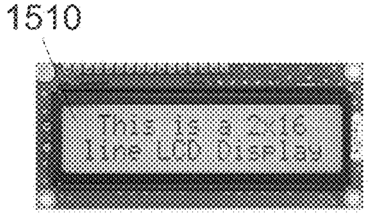
FIG. 15B
FIG. 15C

SPACE SAVING ACOUSTIC TRANSDUCER

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to transducers, and in particular, to a slim acoustic transducer with motor assemblies that flank the electronic components and provide improved diaphragm displacement within shallow system design form factors.

BACKGROUND

Consumers are driving requirements for much smaller and shallower form factor audio systems with more pleasing aesthetics. This is being reflected through the sales force and eventually works its way back through the organization to engineering as new design targets making form factors thinner, smaller, and more compact. These new requirements for extremely small (shallow or low depth) form factor audio devices (e.g., sound bars) leaves little room for the transducers, much less the electronics that drive these transducers. The total depth of these sound bar systems, for example, is typically dictated primarily by the combined depth of the transducer assembly and support electronics. This is because typically the electronics are placed directly behind the transducer.

Reducing the size of electronic components and also the overall depth of the transducer assembly are typical options for creating a very shallow form factor system design. However, a reduced transducer assembly depth has direct impact to the diaphragm's maximum displacement capability and can also impact the size of the motor required to drive the voice coil/diaphragm assembly. Ultimately, achieving these very shallow system form factor designs in this manner has a negative impact on cost and usage complexity, appearance and size, and ultimately performance.

SUMMARY

One embodiment provides an acoustic transducer including a diaphragm coupled to an upper portion. A first voice coil is coupled to a first side of the diaphragm. A second voice coil is coupled to a second side of the diaphragm. A first magnetic motor assembly is coupled to a first side of a lower portion. A second magnetic motor assembly is coupled to a second side of the lower portion. An electronics system is coupled to the lower portion and disposed behind the diaphragm and between the first magnetic motor assembly and the second motor assembly. The first voice coil is at least partially disposed within a gap of the first magnetic motor assembly, and the second voice coil is at least partially disposed within a gap of the second magnetic motor assembly.

Another embodiment includes a thin acoustic transducer including a first portion comprising: a diaphragm coupled to the first portion; a first voice coil coupled to a first side of the diaphragm; a second voice coil coupled to a second side of the diaphragm; a first magnetic motor assembly coupled to the first side of the first portion; and a second magnetic motor assembly coupled to the second side of the first portion. A second portion includes an electronics system coupled to the second portion and disposed behind the diaphragm and between the first magnetic motor assembly and the second motor assembly. The first portion is coupled to the second portion, the first voice coil is at least partially disposed within a gap of the first magnetic motor assembly, and the second voice coil is at least partially disposed within a gap of the second magnetic motor assembly.

These and other features, aspects and advantages of the one or more embodiments will become understood with reference to the following description, appended claims and accompanying figures.

BRIEF DESCRIPTION OF THE DRAWINGS

FIG. 10A illustrates an upper portion of a thin transducer, according to some embodiments;

FIG. 10B illustrates a lower electronics portion for the upper portion of the thin transducer showed in FIG. 10A, according to some embodiments;

FIG. 11A illustrates a thin transducer assembly with an enclosure, according to some embodiments;

FIG. 11B illustrates an internal view of the thin transducer assembly shown in FIG. 11A, according to some embodiments;

FIGS. 12A-B illustrates images of an upper portion of a thin transducer assembly, according to some embodiments;

FIGS. 13A-D illustrate images of a thin transducer assembly with the motor portion shown as a single assembly unit, according to some embodiments;

FIGS. 14A-C illustrate images of a thin transducer assembly with a lower suspension for greater displacement stability, according to some embodiments;

FIG. 15A illustrates an upper portion of a thin transducer with a transparent diaphragm, according to some embodiments; and FIGS. 15B-C illustrates an example display circuitry that may be visualized using the upper portion showed in FIG. 15A, according to some embodiments.

DETAILED DESCRIPTION

Figure 1:
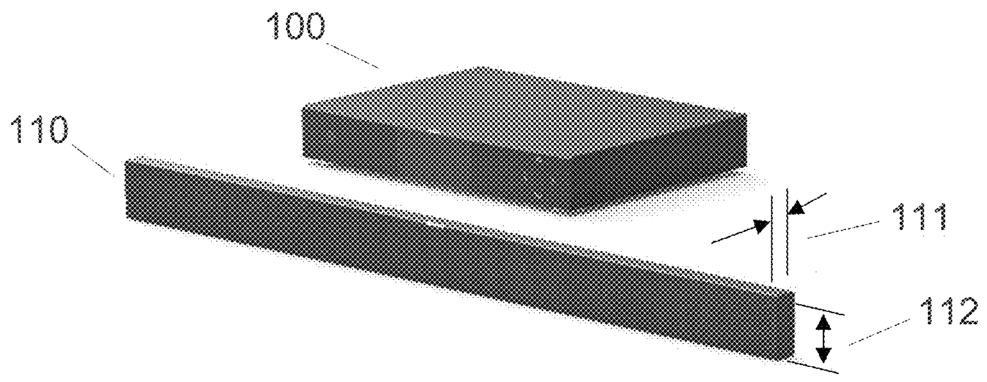
FIG. 1 illustrates an example conventional sound bar and separate system electronics.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to transducers, and in particular, to a slim acoustic transducer with motor assemblies that flank the electronic components and provide improved diaphragm displacement within shallow system design form factors. One embodiment provides an acoustic transducer including a diaphragm coupled to an upper portion. A first voice coil is coupled to a first side of the diaphragm. A second voice coil is coupled to a second side of the diaphragm. A first magnetic motor assembly is coupled to a first side of a lower portion. A second magnetic motor assembly is coupled to a second side of the lower portion. An electronics system is coupled to the lower portion and disposed behind the diaphragm and between the first magnetic motor assembly and the second motor assembly. The first voice coil is at least partially disposed within a gap of the first magnetic motor assembly, and the second voice coil is at least partially disposed within a gap of the second magnetic motor assembly.

Some embodiments provide transducer assembly components layouts that reclaim the volume of space directly behind the transducer diaphragm. This space is reallocated to both contain the electronic components and provide for greater diaphragm displacement within very shallow system design form factors compared to conventional systems. The greater diaphragm displacement will translate directly to greater sound pressure level (SPL) output (plays louder) and greater low frequency performance (more bass).

In one or more embodiments, the motor(s) and associated voice coil(s) are placed to the extreme sides (or perimeter) of the diaphragm to provide availability of a large area under the diaphragm for electronic circuitry. For example, some embodiments remove a typical lower suspension component. This organization provides the transducer design to maintain a greater diaphragm displacement for improved output performance. In some embodiments, the motor assembly is part of the enclosure and not the transducer assembly. In one example embodiment, the transducer is “created” once the diaphragm/voice-coil/frame assembly is inserted into the enclosure. This maximizes the “volume of space” directly behind the transducer diaphragm for greater displacement and larger electronics.

For expository purposes, the terms “loudspeaker,” “loudspeaker device,” and “loudspeaker system” may be used interchangeably in this specification.

For expository purposes, a diaphragm is a membrane attached to a voice coil, which moves in a magnetic gap, vibrating the diaphragm, and producing sound.

FIG. 1 illustrates an example conventional sound bar 110 and separate system electronics 100. As shown, the shallow form factor design sound bar 110 achieves its footprint with the additional separate box required to contain the system electronics 100. The shallow sound bar 110 shown in this example has a height 112 of about 50 mm, and a depth 111 of about 25 mm (i.e., the example sound bar 110 has the dimensions of approximately 1000 mm×50 mm×25 mm (Length×Height×Depth). The woofer transducers in this example have approximately 2 to 3 mm displacement.

In many conventional cases, to achieve similar very shallow form factor size requirements as one or more embodiments, the electronics are moved outside the enclosure (e.g., sound bar 110) into an additional “accessory” enclosure (e.g., system electronics 100). This is because transducer components (of conventional transducer woofer assemblies with appropriate displacement capacity) typically would occupy most or all of the interior volume up to the rear of the enclosure (see, e.g., FIGS. 2A-C). This design, however, adds an additional extra accessory (enclosure) that needs to be placed in the room. Besides increasing the overall system cost, this would add additional installation and connection complexity for the consumer. This separate component design would not be acceptable if the product direction was to maintain a “one box” solution which included the transducers and electronics.

Figure 2A:
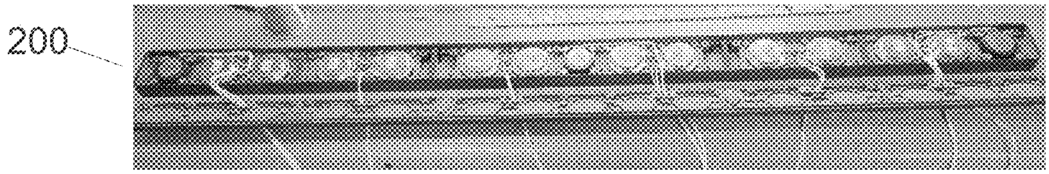
FIGS. 2A-C illustrate internal views of an example conventional sound bar.
Figure 2B:
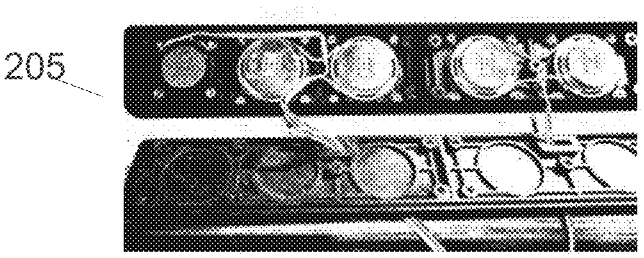
Figure 2C:
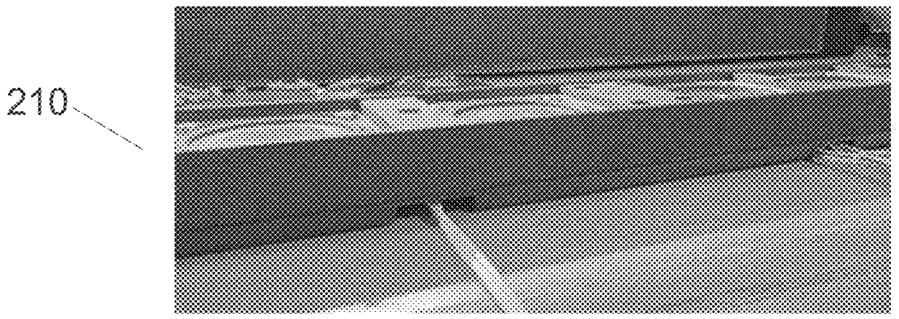

FIGS. 2A-C illustrate internal views of an example conventional sound bar. The example view 200 shows the internal cavity of the shallow form factor sound bar design, and exemplifies how conventional transducers with 2 to 3 mm of peak displacement occupy the entire 25 mm depth of the enclosure. FIG. 2B shows a close-up view 205 of the example sound bar, and FIG. 2C shows a side view 210. As shown, there is not enough room to place electronics between the transducers. So to maintain the shallow sound bar profile, a separate box is required to house the electronics system.

Figure 3A:
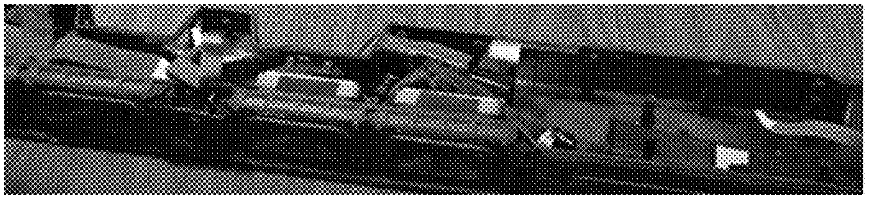
FIGS. 3A-D illustrate views of a conventional example of a sound bar with system electronics placed behind woofer transducers.
Figure 3B:
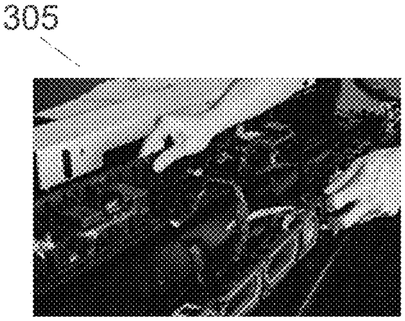
Figure 3C:
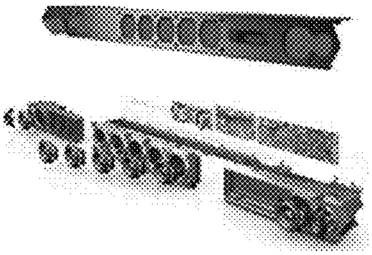
Figure 3D:
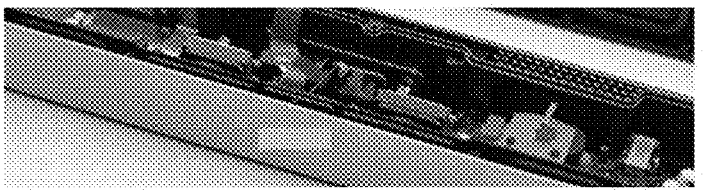

FIGS. 3A-D illustrate views of a conventional example of a sound bar with system electronics placed behind woofer transducers. FIG. 3A shows a view 300 of the electronics placed behind conventional woofer transducers. FIG. 3B shows a view 305 of the transducers separated from the housing. FIG. 3C shows an exploded view 310 of the components of the sound bar. FIG. 3D shows the view 320 showing the electronics. Placing the electronic behind the transducers increases the depth much greater than (20-30 mm) required by future shallow form factor designs.

Figure 4A:
FIGS. 4A-C illustrate views of a conventional example of a sound bar with system electronics placed between woofer transducers.
Figure 4B:
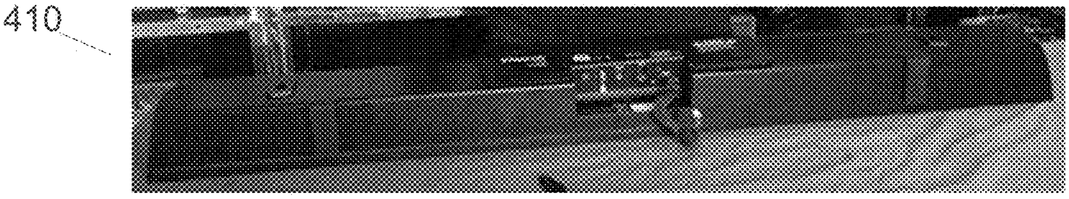
Figure 4C:
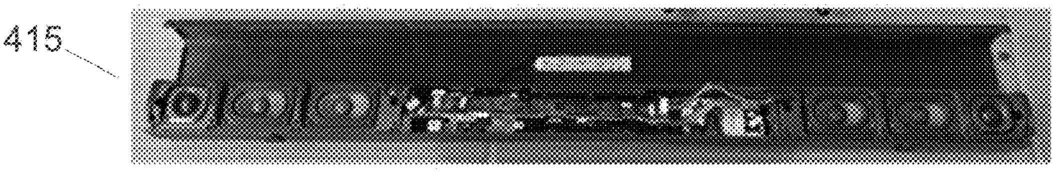

FIGS. 4A-C illustrate views of a conventional example of a sound bar with system electronics placed between woofer transducers. FIG. 4A shows a view 400 of the transducers and electronics between two channels of transducers shown separated from the housing. FIG. 4B shows a rear view 410 of the housing. FIG. 4C shows a front view 415 of the transducers and electronics. The electronics placed between conventional woofer transducers increases the length more than necessary in the simple 2-way sound bar system example.

Figure 5A:
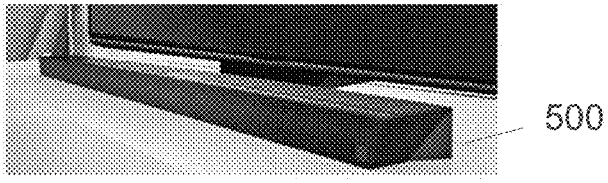
FIGS. 5A-B illustrate views of a conventional example of a sound bar with system electronics placed behind and between woofer transducers.
Figure 5B:
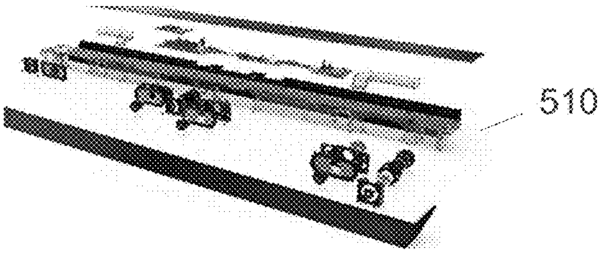

FIGS. 5A-B illustrate views of a conventional example of a sound bar with system electronics placed behind and between woofer transducers. FIG. 5A shows a view 500 of the sound bar system as placed in front of a television (TV) screen. FIG. 5B shows an exploded view 510 of the sound bar system. In this example, the height (45 mm) may be applicable for a future shallow form factor design, however, the depth and length are increased due to the electronics placement and would not be acceptable for future shallow form factor designs.

Figure 6A:
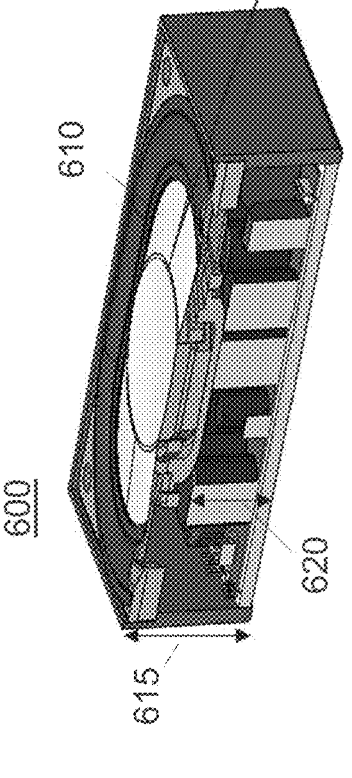
FIGS. 6A-C illustrate internal views of a conventional example of a thin woofer transducer with system electronics placed behind the woofer transducer.
Figure 6B:
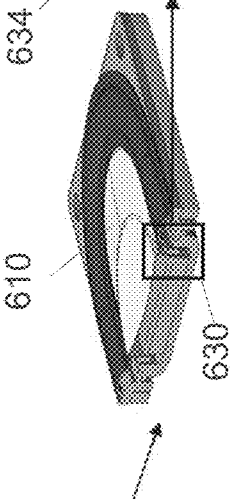
Figure 6C:
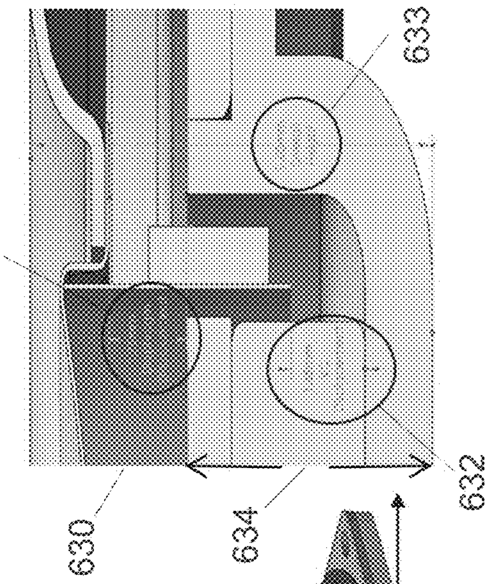

FIGS. 6A-C illustrate internal views of a conventional example of a thin woofer transducer with system electronics placed behind the woofer transducer. FIG. 6A shows a conventional single speaker system 600 with transducer 610. The speaker system 600 has a total depth 615 (25 mm), encompassing electronics depth 620 (15.5 mm) and transducer depth 633 (9.0 mm). This achieves a shallow 25 mm system depth, but greatly constrains the system output and low frequency capability due to a restricted diaphragm displacement of only 1.75 mm. FIG. 6B shows an internal view of the transducer 610 and area 630, which is enlarged in FIG. 6C. If the electronics were to be placed behind the transducer, it would require very shallow transducer designs with limited diaphragm displacement to maintain the 20-30 mm "depth" system form factor target. This is because the motor structure, which "drives" the diaphragm assembly, is typically placed directly behind the moving diaphragm of conventional transducer woofers.

In FIG. 6C, the diaphragm displacement 631 is limited to 1.75 mm. The voice coil (VC) displacement 632 is 1.65 mm. The overall height 633 is 9 mm. Besides the combined depth requirement for the diaphragm assembly and its displacement, the motor assembly depth 634 in this assembly configuration directly adds to this combined depth thus establishing the overall or "total mounting depth" of the conventional woofer transducer 610 assembly structure. Creating a much more shallow transducer assembly by reducing the motor depth and diaphragm displacement would help achieve a more shallow form factor system. Unfortunately, this would directly impact the acoustic output of the slim sound bar system and reduce performance and competitive market advantage because it is known (to those knowledgeable in the art) that transducer diaphragm "displacement" is directly related to output capability and low frequency extension performance. That is, greater displacement=higher SPL output, and also equals greater lower frequency extension. As shown in FIG. 6A, the very shallow (9 mm depth) woofer transducer 610 assembly is needed to fit into the total depth 615 (25 mm) system. The woofer transducer 610 shown is 110×52×9 mm. This conventional design limits displacement of the diaphragm to only 1.75 mm.

Figure 7A:
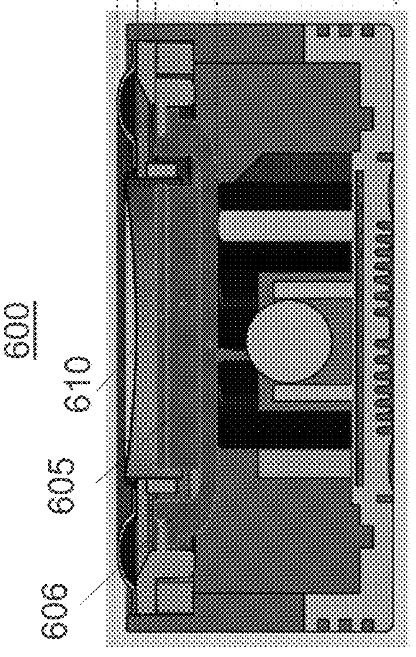
FIG. 7A illustrates an internal view of the thin woofer transducer of FIG. 6A.
Figure 7B:
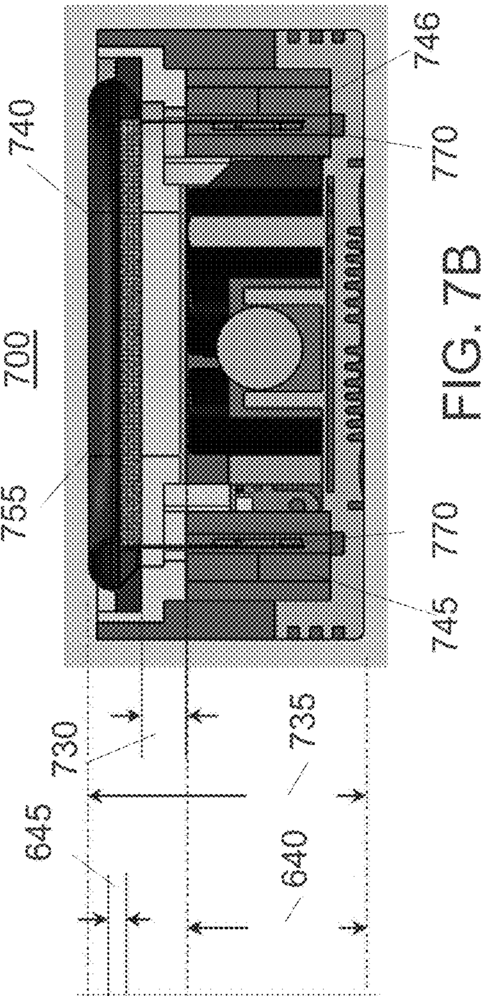
FIG. 7B illustrates an internal view of the thin woofer transducer, according to some embodiments.

FIG. 7A illustrates an internal view of the thin woofer transducer 600 of FIG. 6A. The displacement 645 for the transducer 610 is 1.75 mm. The depth (or height) of the electronics 640 is 15.5 mm, and the overall height 735 is 25 mm. FIG. 7B illustrates an internal view of a thin (woofer) transducer 700, according to some embodiments. The thin transducer 700 is shown with a same enclosure and electronics as shown in FIG. 6A (and FIG. 7A) for the thin woofer transducer 600, but the displacement 730 is 4mm (over twice the displacement). One or more embodiments reorganizes the conventional transducer assembly components in order to reclaim the volume of space directly behind the transducer diaphragm 755 with surround 740. This space behind the transducer diaphragm 755 is reclaimed to both contain the electronic components and allow greater transducer diaphragm 755 displacement 730 within very shallow system design form factors compared to conventional systems, such as the thin woofer transducer 600. The greater diaphragm displacement 730 (as compared to displacement 645) translates directly to greater SPL output (i.e., plays louder) and greater low frequency performance (i.e., more bass).

In some embodiments, repositioning of the motor(s) 745 and 746 and associated voice coils(s) 770 to the extreme sides (or perimeter) of the transducer diaphragm 755, open up a large area under the transducer diaphragm 755 for electronic circuitry. In this example thin transducer 700, the typical lower suspension component is removed. This allows the thin transducer 700 design to maintain a greater diaphragm displacement 730 for improved output performance than would normally be achieved in situations where a very shallow transducer assembly is used (e.g., the thin woofer transducer 600).

As shown, the thin transducer 700 is a space saving transducer where two "bar style" motor assemblies 745 and 746 are positioned to flank the electronics—one on each side. This configuration allows the transducer's motor assemblies 745 and 746 and system electronics to be used in the same "parallel" space. Their individual depths are no longer additive, so the overall system depth may be reduced. The design of the thin transducer 700 recovers a larger percentage of the overall system depth (overall height 735) for diaphragm displacement 730 without the need to use an overly thin transducer assembly with restricted diaphragm displacement as exemplified by thin woofer transducer 610.

FIGS. 8A-D illustrates views of a thin transducer 700 including electronics 750 showing increased displacement over conventional thin transducers, according to some embodiments. In this embodiment, the magnetic drive system (the motor portion) is placed, mounted, or directly integrated (as in co-molding), into the actual enclosure (e.g., a speaker enclosure, a sound bar, a TV, etc.) as an "individual" component of the enclosure. This maximizes the distance between the motor assemblies 745/746 (e.g., steel plates on either side of a magnet) on both sides of the enclosure 775, and voice coil 770 assemblies, thus increasing the interior space 790 (FIG. 9) behind the diaphragm 755 that is recovered and repurposed for electronics 750 and diaphragm 755 displacement. In the example thin transducer 700 shown, two motor assemblies are widely spaced and mounted directly to the rear heatsink 760 to assist with thermal dissipation. The diaphragm-voice coil 770 would be of a separate "transducer" assembly (FIG. 8B) connected and inserted into the enclosure 775 as one of the final steps. In the building of the thin transducer 700, the voice coils 770 are placed in the spaces (magnetic gaps) 780/781 of the motor assemblies. The contact terminals 765 are connected to the electronics 750 for receiving signals from a source (e.g., TV, a receiver, cable, satellite, etc.). In one or more embodiments, the diaphragm 755 displacement of this example thin transducer 700 is about 4 mm, over two times that of the thin transducer 600 example shown in FIGS. 6A and 7A.

Figure 8A:
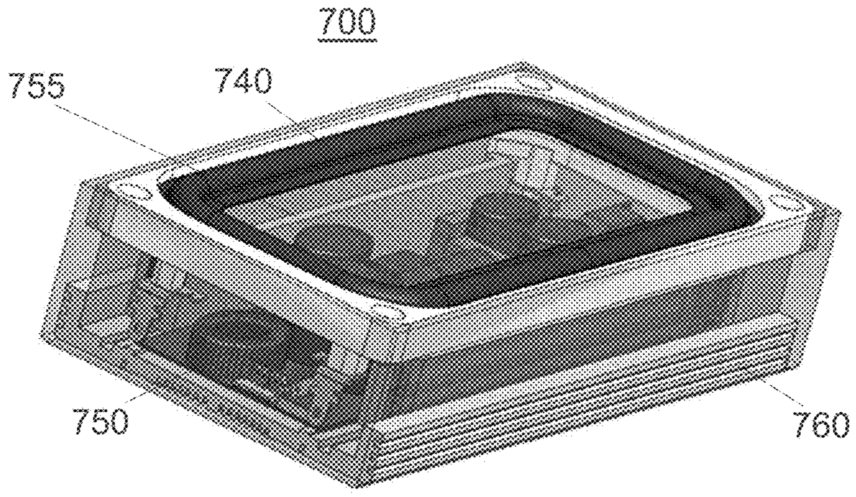
FIGS. 8A-D illustrates views of a thin transducer and electronics showing increased displacement over conventional thin transducers, according to some embodiments.
Figure 8B:
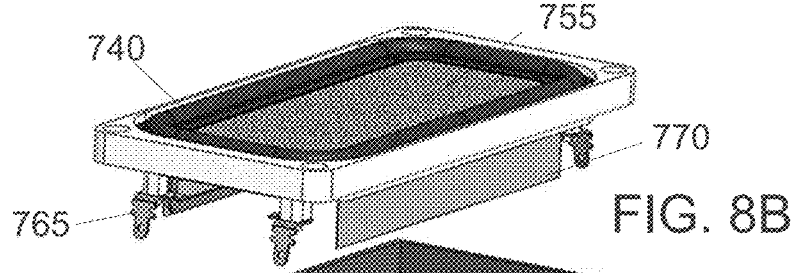
Figure 8C:
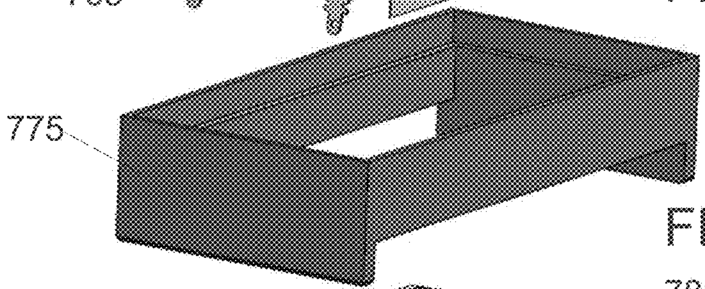
Figure 8D:
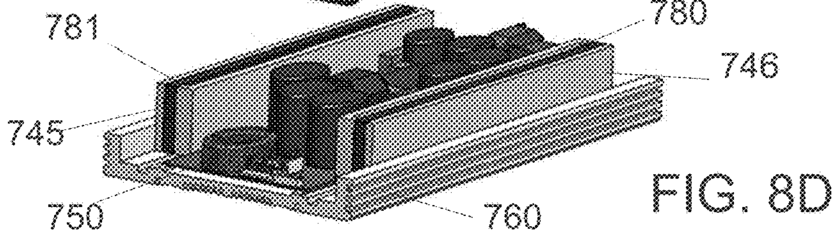
Figure 9:
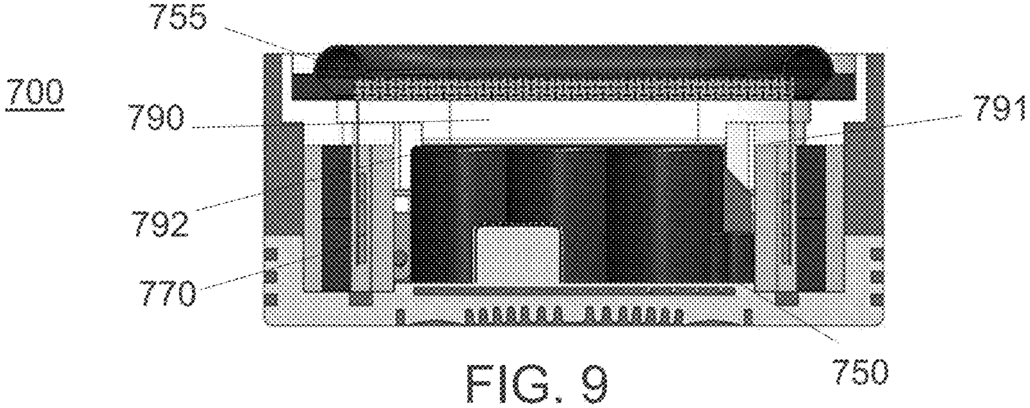
FIG. 9 illustrates an internal view of the thin transducer and electronic of FIG. 8A, according to some embodiments.

FIG. 9 illustrates an internal view of the thin transducer 700 and electronics 750 of FIG. 8A, according to some embodiments. The motor height 791 is the height of the motor assemblies 745/746 (FIG. 8D), and the electronics 750 height 792 provide the interior space 790 for a large displacement capability for the diaphragm 755. Common practice would typically place a motor-voice coil directly behind the center of the diaphragm 755 and part of the actual transducer assembly due to simplicity and cost. It would be counter-intuitive to install the motor structure as an individual component of a sound system (e.g., a sound bar system, etc.), separating it from the rest of the transducer assembly. In one or more embodiments, doing this, however, allows maximum spacing between the motors and more space for the electronics 750.

FIG. 10A illustrates an upper portion 1005 of a thin transducer 1000, according to some embodiments. The upper portion 1005 has the voice coils 770 on the opposite sides similar to the thin transducer 700 of FIGS. 8A-D. The upper portion 1005 inserts into the enclosure 1020 (FIG. 10B, e.g., a sound bar enclosure, etc.). FIG. 10B illustrates a lower electronics portion 1010 for the upper portion 1005 of the thin transducer shown in FIG. 10A, according to some embodiments. The magnetic drive system (the motor portion 785/786 on both sides) is placed, mounted, or directly integrated (as in co-molding), into the actual enclosure 1020 as individual components. In this example, the motor portion and electronics 750 (or amplifier (or amp) module) are contained fully within the enclosure 1020 without an exterior heatsink. In some embodiments, the diaphragm 755 and voice coil 770 "transducer assembly" is separately assembled component (upper portion 1005) connected and inserted into the enclosure 1020 as one of the final steps. In one or more embodiments, the diaphragm 755 displacement of this example is about 4 mm, and the dimensions may be 110×52 mm.

FIG. 11A illustrates a thin transducer assembly 1100 with enclosure 795 (shown as transparent for viewing purposes), according to some embodiments. FIG. 11B illustrates an internal view of the thin transducer assembly 1100 shown in FIG. 11A, according to some embodiments. In one or more embodiments, thin transducer assembly 1100 does not include a rear heatsink, and has dimensions that may be 113×55×24 mm. The electronics 750 may include an amplifier module fitted between the motor assemblies on, for example, a printed circuit board (PCB) (e.g., 100×30×12.5 mm). The displacement 730 is the distance between the top of the electronics 750 (and motor assemblies) to the diaphragm 755.

FIGS. 12A-B illustrates images of a thin transducer assembly 1200, according to some embodiments. In one or more embodiments, the magnetic drive assemblies 785/786, see FIG. 13A), is placed, mounted, or directly integrated (as in co-molding), as part of a singular transducer assembly 756. The transducer topology is rearranged to position the magnetic drive assemblies 785/786 and voice coils 770 to each side (or perimeter) of the moving diaphragm assembly. In some embodiments, all components are mounted into a single final transducer assembly support structure. This eliminates the bulk of the "part volume" and "thickness" occupied by the transducer components directly behind the moving diaphragm 755, and reallocates it for electronic drive circuitry 1320 (FIG. 13C) and diaphragm displacement 730.

FIGS. 13A-D illustrate images of the thin transducer assembly 1200 with the electronic drive circuitry 1320 shown as a single assembly unit 1300, according to some embodiments. Thin dual gap "bar style" motor assemblies 785/786 with single flat voice coil 770 is used on each side of the diaphragm 755 and is illustrated as one non-axisymmetric assembly example. Other motor topologies, or axisymmetric assemblies may also be employed in some embodiments. The maximum motor spacing 1310 may be slightly reduced from the thin transducer 700 (see, e.g., FIG. 8A), however, a large diaphragm displacement 730 of 4 mm may still be achieved. Due to electronic part miniaturization and more efficient (low heat) amplifier design, which allows placement in closer proximity to the transducer components. Advancements in transducer software component materials (especially for the diaphragm 755) allow the use of a flat geometry required to yield maximum displacement. Space efficient magnetic systems help maximize the area for these.

FIGS. 14A-C illustrate images of a thin transducer assembly 1400 with a lower suspension 1410 for greater displacement stability, according to some embodiments. In some embodiments, the thin transducer assembly 1400 is similar to the thin transducer assembly 1200 (FIGS. 12A-B, FIGS. 13A-D), but now including additional lower suspension (or spider) 1410 and center coupler 1420. In one or more embodiments, the lower suspension 1410 may be coupled with the center coupler 1420, motor assembly 785 and singular transducer assembly 756. Inclusion of the lower suspension 1410 offers increased displacement stability, but slightly reduces the space (vertical height) available for electronic drive circuitry 1320. In some embodiments, the diaphragm displacement 1430 of the thin transducer assembly 1400 is about 4 mm.

FIG. 15A illustrates a thin transducer 1500 with a transparent diaphragm 1555, according to some embodiments. FIGS. 15B-C illustrates an example display circuitry 1510 that may be visualized using the thin transducer 1500 showed in FIG. 15A, according to some embodiments. The thin transducer 1500 may be similar to the thin transducer assembly 1200, FIGS. 12A-B. The example circuitry 1510 may be a display circuitry, such as a liquid crystal display (LCD), light emitting diode (LED) display, etc., for showing messages, sound level, source information, content information, etc.

In one or more embodiments, a non-axisymmetric assembly may be employed (similar to the above-described thin transducer assemblies) with one or more motor assemblies and voice coils positioned around the diaphragm perimeter. Some embodiments may be a non-axisymmetric assembly (similar to the above-described thin transducer assemblies), but with a continuous voice coil (loop) around entire diaphragm perimeter. In these embodiments, the voice coil flux linkage from the motor structure is applied to the entire coil length or a percentage of the coil length.

In some embodiments, the thin transducer assembly may be employed (similar to the above-described thin transducer assemblies) but with single gap motor or motors. One or more embodiments may employ a thin transducer axisymmetric assembly. Some embodiments employ a thin transducer assembly similar to the transducer assemblies shown in FIGS. 12A-14C, except the electronics are placed on either side or around a singular motor structure assembly.

One or more embodiments may be deployed in thin form factor sound bars, subwoofers, wall systems, BLUETOOTH® devices, headphones and TVs, and may be placed for use on a shelf, credenza, wall mount (internal and external), etc., applications. It would offer the ability to create very shallow compact enclosures that contained all the electronics without the need to overly constrain the transducer thickness or displacement capability. This will help maintain performance competitiveness despite the thin form factor requirements.

Some embodiments may include high power subwoofers with shallow profiles to mount under or behind furniture, or even on or within walls. Other applications may include devices where electronics and high quality transducers with large displacement must be used within the same shallow enclosure. One or more embodiments may be deployed in appliances, such as refrigerators, washers/dryers, etc.

In one or more embodiments, the performance exceeds conventional thin transducers such that not even two conventional transducers combined can achieve the same performance as the embodiments described herein due to the embodiments abilities to maintain higher diaphragm displacement over conventional thin transducers within very shallow system enclosures. The higher displacement capability of one or more embodiments translates directly to improved performance. Besides the better performance, all of the system electronics can be included within the same enclosure for a simple and aesthetic one-box solution.

In some embodiments, the system enclosure may be 39 mm deep with other embodiments being 20 mm deep. For thinner TVs, the depth may be reduced from 15 mm to approximately 12 mm. In one or more embodiments, the slim transducers may be implemented for a woofer, a midrange, a tweeter and full-range transducers.

In one or more embodiments, the magnets for the motor assemblies may be comprised of rare earth magnetic material, such as: Neodymium (Nd), Nd Iron Boron (NdFeB), Samarium Cobalt, etc. The structure material surrounding the thin transducer assemblies may be plastic, aluminum, etc. In some embodiments, the diaphragm of the thin transducer may be made of paper, polypropylene (PP), polyetheretherketone (PEEK) polycarbonate (PC), Polyethylene Terephthalate (PET), silk, glass fiber, carbon fiber, titanium, aluminum, aluminum-magnesium alloy, nickel, beryllium, etc.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A thin acoustic transducer comprising:
- an upper portion comprising:
  - a diaphragm;
  - a first voice coil on a first side of the upper portion, wherein the first voice coil is disposed behind the diaphragm and proximate to a first extreme side of the diaphragm; and
  - a second voice coil on a second side of the upper portion, wherein the second voice coil is disposed behind the diaphragm and proximate to a second extreme side of the diaphragm; and
- an enclosure the upper portion is inserted into, wherein the enclosure comprises:
  - a first magnetic motor assembly on a first side of the enclosure, wherein the first magnetic motor assembly is disposed behind the diaphragm and proximate to the first extreme side of the diaphragm;
  - a second magnetic motor assembly on a second side of the enclosure, wherein the second magnetic motor assembly is disposed behind the diaphragm and proximate to the second extreme side of the diaphragm; and
  - an electronics system, wherein the electronics system is disposed behind the diaphragm and between the first magnetic motor assembly and the second magnetic motor assembly;
- wherein the upper portion that includes the diaphragm, the first voice coil, and the second voice coil is a component that is separately assembled from the enclosure and then inserted into the enclosure, such that the first voice coil is at least partially disposed within a first gap of the first magnetic motor assembly, and the second voice coil is at least partially disposed within a second gap of the second magnetic motor assembly.

2. The transducer of claim 1, wherein the first side of the enclosure is an upper side, and the second side of the enclosure is a lower side.

3. The transducer of claim 1, wherein the first side of the enclosure is a left side, and the second side of the enclosure is a right side.

4. The transducer of claim 1, wherein a space between a top of the electronics system and a lower portion of the diaphragm provides room for displacement of the diaphragm.

5. The transducer of claim 4, wherein the overall height of the transducer is about 25 mm, and the displacement is about 4 mm.

6. The transducer of claim 1, further comprising a suspension coupled to the first magnetic motor assembly and the second magnetic motor assembly, or coupled to a transducer support frame.

7. The transducer of claim 1, further comprising:
- a display circuitry coupled to the electronics system, wherein the diaphragm comprises transparent material.

8. The transducer of claim 1, wherein the first magnetic motor assembly and the second magnetic motor assembly each has a height equal to or less than a height of the electronics system.

9. The transducer of claim 1, wherein the first magnetic motor assembly and the second magnetic motor assembly are coupled to a heatsink.

10. The transducer of claim 1, wherein the transducer is disposed in one of a sound bar, a wall system, a subwoofer, a television system, headphones, a wireless portable speaker or an appliance.

11. A thin acoustic transducer comprising:
- a first portion comprising:
  - a diaphragm;
  - a first voice coil on a first side of the first portion, wherein the first voice coil is disposed behind the diaphragm and proximate to a first extreme side of the diaphragm; and
  - a second voice coil on a second side of the first portion, wherein the second voice coil is disposed behind the diaphragm and proximate to a second extreme side of the diaphragm; and
- a second portion the first portion is coupled to, wherein the second portion comprises:
  - a first magnetic motor assembly on a first side of the second portion, wherein the first magnetic motor assembly is disposed behind the diaphragm and proximate to the first extreme side of the diaphragm;

a second magnetic motor assembly on a second side of the second portion, wherein the second magnetic motor assembly is disposed behind the diaphragm and proximate to the second extreme side of the diaphragm; and an electronics system, wherein the electronics system is disposed behind the diaphragm and between the first magnetic motor assembly and the second magnetic motor assembly;

wherein the first portion that includes the diaphragm, the first voice coil, and the second voice coil is a component that is separately assembled from the second portion and then coupled to the second portion, such that the first voice coil is at least partially disposed within a first gap of the first magnetic motor assembly, and the second voice coil is at least partially disposed within a second gap of the second magnetic motor assembly.

12. The transducer of claim 11, wherein the first side of the second portion is an upper side, and the second side of the second portion is a lower side.

13. The transducer of claim 11, wherein the first side of the second portion is a left side, and the second side of the second portion is a right side.

14. The transducer of claim 11, wherein a space between a top of the electronics system and a lower portion of the diaphragm provides room for displacement of the diaphragm.

15. The transducer of claim 11, further comprising a suspension coupled to the first magnetic motor assembly and the second magnetic motor assembly, or coupled to a transducer support frame.

16. The transducer of claim 11, further comprising:

a display circuitry coupled to the electronics system, wherein the diaphragm comprises transparent material.

17. The transducer of claim 11, wherein the first magnetic motor assembly and the second magnetic motor assembly each has a height equal to or less than a height of the electronics system.

18. The transducer of claim 11, wherein the first magnetic motor assembly and the second magnetic motor assembly are coupled to a heatsink.

19. The transducer of claim 11, wherein the transducer is disposed in one of a sound bar, a wall system, a subwoofer, a television system, headphones, a wireless portable speaker or an appliance.

* * * * *